US 12,538,912 B1

(12) United States Patent
Buell

(10) Patent No.: US 12,538,912 B1
(45) Date of Patent: Feb. 3, 2026

(54) FLY-CASTING TRAINING SYSTEM AND METHOD OF FLY-CASTING

(71) Applicant: Loren Scott Buell, Flagstaff, AZ (US)

(72) Inventor: Loren Scott Buell, Flagstaff, AZ (US)

(73) Assignee: SCOTT FLYCASTING LLC, Scottsdale, AZ (US)

( * ) Notice: Subject to any disclaimer, the term of this patent is extended or adjusted under 35 U.S.C. 154(b) by 0 days.

(21) Appl. No.: 19/248,448

(22) Filed: Jun. 24, 2025

(51) Int. Cl.
*A01K 99/00* (2006.01)
*A01K 97/00* (2006.01)
*G09B 19/00* (2006.01)

(52) U.S. Cl.
CPC ............ *A01K 99/00* (2013.01); *A01K 97/00* (2013.01); *G09B 19/0038* (2013.01)

(58) Field of Classification Search
CPC ...... A01K 97/00; A01K 99/00; A01K 87/008; G09B 19/0038
USPC .......................... 43/4, 4.5, 21.2, 25; 434/247
See application file for complete search history.

(56) References Cited

U.S. PATENT DOCUMENTS

| | | | | |
|---|---|---|---|---|
| 2,022,910 A * | 12/1935 | Hanley | ............... | A63B 69/0059 473/214 |
| 2,212,212 A * | 8/1940 | Planitz | ................... | A01K 97/10 24/339 |
| 2,443,946 A * | 6/1948 | Bozorth, Jr. | ........... | A01K 87/08 43/25 |
| 2,869,276 A * | 1/1959 | Hagen | ..................... | A01K 97/10 43/25 |
| 3,078,597 A * | 2/1963 | Sharps | ................... | G09B 19/24 434/247 |
| 3,367,056 A * | 2/1968 | Johnson | ................. | A01K 87/08 D8/394 |
| 3,372,510 A * | 3/1968 | Arsenault | .............. | A01K 87/08 294/58 |
| 3,791,063 A * | 2/1974 | Harker | ................... | A01K 87/08 43/4.5 |
| 4,559,932 A * | 12/1985 | Salort | ................... | A61F 5/0118 602/20 |
| 4,654,996 A * | 4/1987 | Gieselman | ............. | A01K 87/08 43/25 |

(Continued)

FOREIGN PATENT DOCUMENTS

DE   20217665 U1 *  5/2004 ........... A63B 21/023
GB   2243282 A  * 10/1991 ............. A01K 97/00

(Continued)

*Primary Examiner* — Darren W Ark
(74) *Attorney, Agent, or Firm* — Invention To Patent Services; Alex Hobson

(57) ABSTRACT

A fly-casting training band system includes an arm strap coupled to a hand strap by a pair of elastic tether extensions and is configured to extend around the elbow and hand that grasps the fishing rod above the reel, the top arm. The hand strap extends around hand and arm strap around the elbow. The two tether extensions are elastic tethers that extend along the forearm between the hand strap and arm strap. The elastic tethers produce an elastic force to resist the straightening of the top arm. The increasing force when the person straightens their arm provides feedback to avoid this motion. Therefore, a person may be trained to properly cast a fly-fishing line by using their bottom hand to pull the end handle toward them as the top hand simply guides the rod tip toward the direction they want to cast.

16 Claims, 5 Drawing Sheets

(56) References Cited

U.S. PATENT DOCUMENTS

| | | | | |
|---|---|---|---|---|
| 4,875,677 | A * | 10/1989 | Tetreault | A63B 69/0002 |
| | | | | 602/20 |
| 5,159,775 | A * | 11/1992 | Sutula, Jr. | A01K 87/08 |
| | | | | 294/58 |
| 5,174,575 | A * | 12/1992 | Leith | A63B 69/0059 |
| | | | | 473/227 |
| 5,212,900 | A * | 5/1993 | Perry | A01K 97/10 |
| | | | | 224/267 |
| 5,297,355 | A * | 3/1994 | O'Brien | F41J 5/042 |
| | | | | 273/377 |
| 5,348,292 | A * | 9/1994 | Norman, Sr. | A63B 69/0059 |
| | | | | 473/213 |
| D353,262 | S * | 12/1994 | Cantavespre | D22/139 |
| 5,403,002 | A * | 4/1995 | Brunty | A61F 5/013 |
| | | | | 473/438 |
| 5,426,884 | A * | 6/1995 | Makowsky | A01K 87/08 |
| | | | | 43/25 |
| 5,618,040 | A * | 4/1997 | Parten | A63B 21/4019 |
| | | | | 473/464 |
| 5,910,004 | A * | 6/1999 | Antosh | A01K 87/08 |
| | | | | 224/267 |
| 6,065,240 | A * | 5/2000 | Paddock | A01K 87/08 |
| | | | | 43/25 |
| 6,067,741 | A * | 5/2000 | Eaton | A01K 87/08 |
| | | | | 43/18.1 R |
| 6,412,211 | B1 * | 7/2002 | Smith | A01K 97/00 |
| | | | | 43/4 |
| 6,493,982 | B1 * | 12/2002 | Macaluso | A01K 87/08 |
| | | | | 43/25 |
| 6,514,163 | B2 * | 2/2003 | Burns | A63B 21/4019 |
| | | | | 473/422 |
| 6,631,866 | B1 * | 10/2003 | Obrink | A01K 89/016 |
| | | | | 242/390.8 |
| 6,748,691 | B2 * | 6/2004 | Doucette | A01K 87/08 |
| | | | | 43/25 |
| 6,763,628 | B1 * | 7/2004 | Bartlett | A01K 97/00 |
| | | | | 43/25 |
| 6,918,202 | B2 * | 7/2005 | Merritt | A01K 97/00 |
| | | | | 43/4.5 |
| 7,124,536 | B2 * | 10/2006 | Harkey | A01K 87/08 |
| | | | | 43/21.2 |
| 7,147,581 | B1 * | 12/2006 | Williams, III | A63B 69/0059 |
| | | | | 473/553 |
| D548,303 | S * | 8/2007 | Hernandez | D3/221 |
| 7,354,361 | B2 * | 4/2008 | Williams, III | G07F 9/026 |
| | | | | 473/464 |
| 7,707,766 | B2 * | 5/2010 | Millen | A01K 87/08 |
| | | | | 43/25 |
| D628,265 | S * | 11/2010 | Schwartz | D3/221 |
| 7,980,018 | B2 | 7/2011 | Selfors | |
| 8,414,301 | B2 * | 4/2013 | Dean | G09B 19/0038 |
| | | | | 434/247 |
| 10,086,250 | B2 * | 10/2018 | Wright | G09B 19/0038 |
| 10,206,382 | B2 * | 2/2019 | Rich | A01K 91/02 |
| 11,191,991 | B2 * | 12/2021 | Parent | A63B 21/0557 |
| 11,766,035 | B2 * | 9/2023 | Alfaro | A01K 87/08 |
| | | | | 43/21.2 |
| 12,064,659 | B2 * | 8/2024 | Byrd | A63B 69/0059 |
| 12,185,708 | B2 * | 1/2025 | Thompson | A01K 85/08 |
| 12,356,973 | B2 * | 7/2025 | Thompson | A01K 91/12 |
| 2005/0279008 | A1 * | 12/2005 | Hernandez | A01K 97/10 |
| | | | | 43/21.2 |
| 2007/0214708 | A1 * | 9/2007 | Millen | A01K 87/08 |
| | | | | 43/25 |
| 2011/0111930 | A1 * | 5/2011 | Byrd | A63B 69/0028 |
| | | | | 482/121 |
| 2012/0005806 | A1 * | 1/2012 | Bowers | A01K 91/02 |
| | | | | 2/161.5 |
| 2012/0011634 | A1 * | 1/2012 | Pelinsky | A41D 13/087 |
| | | | | 2/21 |
| 2018/0374382 | A1 * | 12/2018 | Osimo | G09B 19/0038 |
| 2019/0289933 | A1 * | 9/2019 | Kinsora | A01K 97/00 |
| 2020/0100483 | A1 * | 4/2020 | Delulio | A01K 91/03 |
| 2025/0134081 | A1 * | 5/2025 | Thompson | A01K 97/00 |

FOREIGN PATENT DOCUMENTS

| | | | | |
|---|---|---|---|---|
| GB | | 2415119 A | * 12/2005 | A01K 97/00 |
| JP | | 3005286 U | * 12/1994 | |
| JP | | 2015080454 A | * 4/2015 | |
| JP | | 2020178626 A | * 11/2020 | |
| WO | WO-03009680 A1 | | * 2/2003 | A63B 69/36 |

\* cited by examiner

FLY-CASTING TRAINING SYSTEM AND METHOD OF FLY-CASTING

BACKGROUND OF THE INVENTION

Field of the Invention

The invention relates a fly-casting training band system and method of fly-casting using said system, wherein the system includes an arm strap coupled to a hand strap by a pair of elastic tether extensions.

Background

Fly casting with a fly-fishing rod is much different from casting with a conventional fishing rod and lure or bait. A fly or flies are very light and are often designed to float on the water, thereby simulating a fly or insect landing on the water. Because the fly is so lightweight, fly-fishing rods are typically much longer than conventional fishing rods to provide more whip and momentum to the fly and fishing line for casting an effective distance. Spey fishing rods are very long, such as 2.5 m or more, 3 m or more or even 4 m or more. Casting a fly with a fly-fishing rod requires pivoting the rod to produce momentum with the fishing line to effectively cast. Many people use both hands to cast and push the rod with their top hand, which is typically a dominant hand, while holding the end of the rod, or end handle with their bottom hand, which is usually a non-dominant hand. A more effective way to cast a fly-fishing line such as with a Spey fishing rod utilizes a pulling motion on the end handle with the bottom hand, while simply guiding the direction of the tip of the rod with the top hand. It is difficult for people to learn this method as it requires more force being applied in the pulling motion with their bottom hand.

SUMMARY OF THE INVENTION

The invention is directed to a fly-casting training band system and method of fly-casting using said system, wherein the system includes an arm strap coupled to a hand strap by a pair of elastic tether extensions. The fly-casting training band is configured around the top arm of a person with the arm strap extending around the back side of the elbow and the hand strap extending around the thumb, such as between the thumb and the index finger. The two tether extensions are elastic tethers that extend along the forearm between the hand strap and arm strap. The two tether extensions may extend substantially parallel (within 20 degrees of parallel) with the length axis of the forearm from the end of the elbow to the hand. The length of the elastic tethers produces elastic force when donned around the elbow and around the thumb with the elbow bent and this force quickly increases if the person attempts to straighten their arm, thereby stretching the two tether extensions. This elastic force increases when the person straightens their arm to provide feedback to avoid this motion. Therefore, a person may be trained to properly cast a fly-fishing line and fly with the fly-casting training band donned as they cast. Again, the person's top hand will be configured above the reel or between the reel and the tip of the rod, such as on a rod handle and their bottom hand will be configured below the reel, or between the reel and the rod end, such as on an end handle. The bottom hand will pull the end handle toward them to pivot the entire fishing rod as the top hand simply guides the rod tip toward the direction they want to cast. Pivoting the entire rod is a more effective way to produce momentum to cast the fishing line as the rod may bend along a longer length of the rod.

The arm strap may be a planar strap having a curved perimeter for comfort and may be sized to extend around a person's elbow. The arm strap may be oval in shape, having a continuously curved perimeter. The arm strap may have a length of about 10 cm or more, about 12.5 cm or more, about 15 cm or more, about 20 cm or more and any range between and including the values provided. The arms trap may have a width of about 4 cm or more, about 6 cm or more, about 8 cm or more, about 10 cm or more and any range between and including the values provided. The length may be greater than the width such as about 2.0 times greater or more, about 1.5 times greater or more, or 1.25 time greater or more or any other range between and including the values provided. The arm strap may be a supple material that can easily conform to the curvature of a person's arm and may be a piece of leather, or synthetic leather or fabric. The arm strap may be, or include, a planar piece of material having a thickness of about 10 mm or less, about 7.5 mm or less, about 5 mm or less, or even about 2.5 mm or less and any range between and including the values provided.

The hand strap may be a planar strap having that may have a curved perimeter such as curved edges or corners for comfort and may be sized to extend around a person's thumb, such as between the thumb and the index finger. The hand strap may be generally rectangular in shape, having a length that is greater than the width, such as about 1.5 times greater or more, about 2.0 times greater or more, about 2.5 times greater or more and any range between and including the values provided. The hand strap may be rectangular to ensure that the tether extensions are not interfering with hand function and for comfort. The width of the hand strap may be much less than the length, as too much material in the space between the index finger and the thumb may be cumbersome and uncomfortable. However, if the hand strap is too narrow, the force exerted by the elastic tethers may be uncomfortable, as the pressure of the narrow hand strap may be too high. With these considerations, the hand strap may have a length of about 2 cm or more, about 3 cm or more, about 4 cm or more, about 5 cm or more, about 6 cm or more, about 7 cm or more, about 8 cm or more and any range between and including the values provided. The hand strap may have a width of about 10 mm or more, about 15 mm or more, about 20 mm or more, about 15 mm or more, about 30 mm or more and any range between and including the width values provided. The hand strap may be a supple material that can easily conform to the curvature of a person's hand and may be a piece of leather, or synthetic leather or fabric. The hand strap may be, or include, a planar piece of material having a thickness of about 10 mm or less, about 7.5 mm or less, about 5 mm or less, about 2.5 mm or less or even about 1 mm or less and any range between and including the values provided such as from about 1 mm to 5 mm.

Each of the tether extensions extend between the arm and hand strap and may have a length of 25 cm or more, about 30 cm or more, about 35 cm or more, about 40 cm or more and any range between and including the length values provided. Each of the tether extensions may be discrete extensions, extending between and coupling together the ends of the arm strap and ends of the hand strap. A first tether extension may extend between the first arm strap end and the first hand strap end and the second tether extension may extend between a second arm strap end and a second hand strap end. The ends of the arm strap and hand strap may be within about 25 mm or the end, along a length axis, or put another way, may be within 25% of the length of the respective arm strap or hand strap from the end.

In a preferred embodiment, the elastic tether extends across the hand strap and loops back to the arm strap. The hand tether extension may extend across the exposed side of the hand strap, such that it is not extending between the hand strap and the person's hand. The hand strap may have apertures proximal to the opposing ends and the elastic tether may extend through the apertures and along the exposed side of the hand strap as the hand tether extension. Likewise, the elastic tether may extend across the length of the arm strap, an arm tether extension. Again, the arm tether extension may be along an exposed side of the arm strap, opposite the arm side of the arm strap, such that the arm tether extension is not configured between the arm strap and the person's arm or elbow. The arm strap may have apertures proximal to the opposing ends and the elastic tether and may extend through the apertures and along the exposed side of the arm strap.

The elastic tether may form a loop from the arm strap around the hand strap and back to the arm strap, or alternatively the elastic tether may form a loop from the hand strap around the arm strap and back to the hand strap. In either of these two loop versions, the elastic tether may be retained to the hand or arm strap to coupled the three components together. For example, the elastic tether may extend as a loop from the arm strap, across the exposed side of the hand strap and back to the arm strap and may extend through apertures in the arm strap and be tied to or otherwise secured to the arm strap through the aperture. A knot may be tied in ends of the elastic tether to prevent these ends from pulling through the apertures. A stop may be coupled to the elastic tether to prevent the stop and the ends of the elastic tether from pulling through the apertures.

Also, the elastic tether may form a continuous loop and extend across the arm strap, to the hand strap, across the hand strap and back to the arm strap. A continuous loop may be more durable and prevent any detachment of the strap from either the arm strap or hand strap. A continuous loop elastic tether may extend along apertures proximal to the ends of the arm strap and hand strap and extend across the exposed sides of the arm strap and hand strap. When the elastic tether is a continuous loop, the length of the loop may be about 60 cm or more, about 70 cm or more, about 80 cm or more, about 90 cm or more and any range between and including the length values provided.

The elastic tether may be round in cross-section or may be flat, or tape shaped. An elastic tether may be elastic, wherein the elastic tether can be stretched or elongated 25% in length and will return back to an original length upon removal of the elongating force. An elastic tether may be silicone, rubber, urethane, latex and the like. An exemplary elastic tether is SimpleShot, from SimpleShot Inc, Ashville, NC, such as SimpleShot latex tube 1632, having a diameter of 10 mm and an elongation force of at least 2.5 kg/5 cm of elongation or extension of the elastic tether. An elastic tether and/or the tether extensions may have an elongation force, force to elongate the elastic tether an elongation length, of about 1.5 kg/5 cm or more, about 2.5 kg/5 cm or more, about 3.0 kg/5 cm or more and any range between and including the elongation force values provided.

A length adjuster may be coupled with the elastic tether to change a length of the elastic tether to accommodate people with different arm lengths. A length adjuster may be a buckle, that may require the elastic tether to extend through and around apertures in the buckle, or may be spring loaded cord stops, commonly referred to as plastic cord end lock, cordlock, toggle stopper clip, or bungee lock stopper. A spring may be pushed to allow the elastic tether to slide through an aperture in the cord stop and upon release, a spring may wedge a stop against the elastic tether to retain it to the cord stop. A length adjuster, such as a buckle may be configured on one or both of the tether extensions between the arm and hand straps. Alternatively, a length adjuster, such as a cord stop may be configured on or between an end or ends of the elastic tether and one of the arm or hand strap. For example, the elastic tether may form a loop from the arm strap around the hand strap and back to the arm strap and may have the two ends of the elastic tether on the exposed side of the arm strap, with a cord stop configured between each of the ends of the elastic tether and the arm strap to enable individual length adjustment of the two tether extensions between the arm strap and the hand strap.

The invention provides a method of fly-casting wherein the fly-casting training band system is used to encourage use of the bottom hand to pull the end of the rod toward them and discourage them from pushing the rod with their top hand. The method includes providing the fly-casting training band as described herein and donning the fly-casting training band around a person's top arm, with the arm strap around the back of the elbow and the hand strap around their top hand. The arm strap may extend around the bottom of the upper arm, or bottom of the humerus proximal to the elbow, with the strap extending around the back of the elbow. The upper arm as used herein is the segment of the arm from the shoulder to the elbow, or the segment along with the humerus bone extends. The arm strap may be retained around the back of the upper arm proximal to the elbow such as about 12.5 cm or less from the elbow, for example and preferably about 10 cm or less, 7.5 cm or less, or even 5 cm or less and any range between and including the values provided. The two tether extensions between the arm strap and hand strap extend on opposing sides of the forearm and may extend parallel with the length axis of the forearm, within 20 degrees of parallel. The tether extensions are elastic, wherein the force of the tether extensions increases if the person attempts to straighten their arm; a motion that would be used to push the rod in a casting motion with their top hand. The method further includes providing a fly-fishing rod with a reel configured between an end handle and a rod handle and providing fishing line coupled with the reel. The end handle is proximal to a rod end of said fly-fishing rod and the rod handle is configured between the reel and a tip end of the fly-fishing rod.

The casting portion of the method includes grasping the rod handle with the top hand and grasping the end handle with the bottom hand. Then the person pulls the rod end with their bottom hand toward them, to pivot the tip end away from them to cast the fishing line from the fly-fishing rod. The top hand may be used to guide the direction of the rod tip in a direction of the desired cast. The tether extensions will restrict or restrain movement of the top arm and specifically will restrict elongation of the arm, or straightening of the elbow as the force of the elastic tether will increase as the top arm is straightened. This method may be used with a fly-fishing rod and preferably is used with a Spey fishing rod, that is longer than conventional fly-fishing rods.

Proper casting with a fly-fishing rod or Spey rod may require bending of the rod along the length of the rod by the pivoting motion as described herein and bending the entire length of the rod, such as from the rod handle up to the tip, will provide longer casts of the fly and line.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
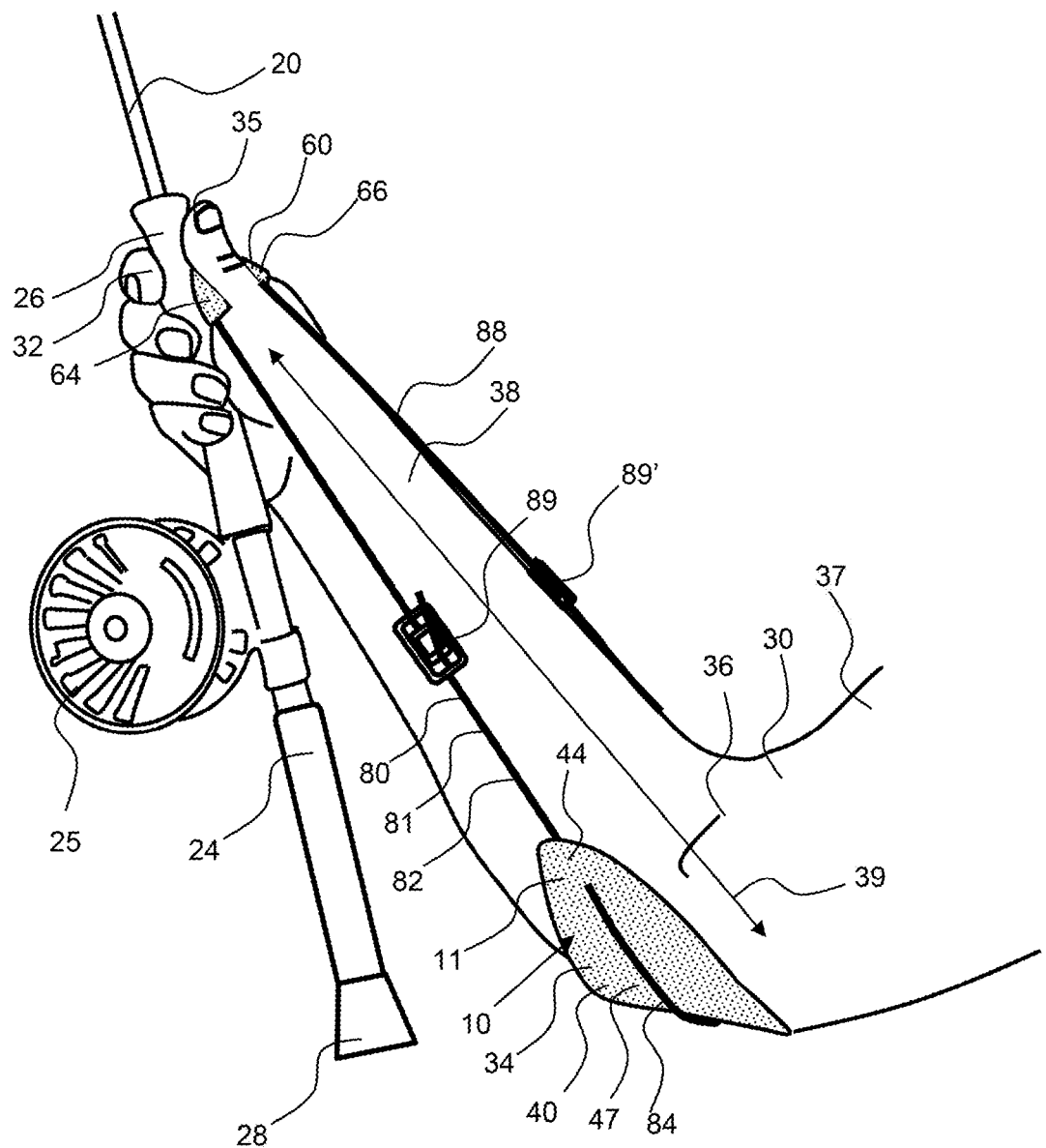
FIG. 1 shows a side view of a person holding a fishing rod, with their top hand and having a fly-casting training band configured around their arm and around their hand, over their thumb.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIG. 1, a person 30 is holding a fly-fishing rod 20, with their top hand 32 and has a fly-casting training band 11 configured around their top arm 36, around the elbow 34 of the upper arm 37, and around their top hand 32, extending around their thumb 35. The fly-casting training band 11 includes an elastic tether 80 having a first tether extension 82 and second tether extension 88 extending between the arm strap 40 and hand strap 60, and as shown, extending along opposing sides of the person's forearm 38. The first tether extension 82 and second tether extension 88 extend substantially parallel (within 20 degrees of parallel) with the length axis 39 of the forearm 38. The elastic tether length may be adjusted by the length adjuster 89 to accommodate people with arms or forearms of different lengths. As shown, the elastic tether 80, such as an elastic band 81 extends along an exposed side 47 of the arm strap 40 and also may extend along an exposed side of the hand strap, for comfort. During casting the fly-fishing rod 20, the person's top hand 32 is holding the rod handle 26, configured between the reel 25 and the tip end (not shown) of the fly-fishing rod 20, and the person's bottom hand would grasp the end handle 24, configured between the reel 25 and the rod end 28. The bottom hand, such as the left hand would pull the end handle toward them to pivot the fishing rod. The rod handle 26 is configured between the reel and tip end of the fly-fishing rod 20.

Figure 2:
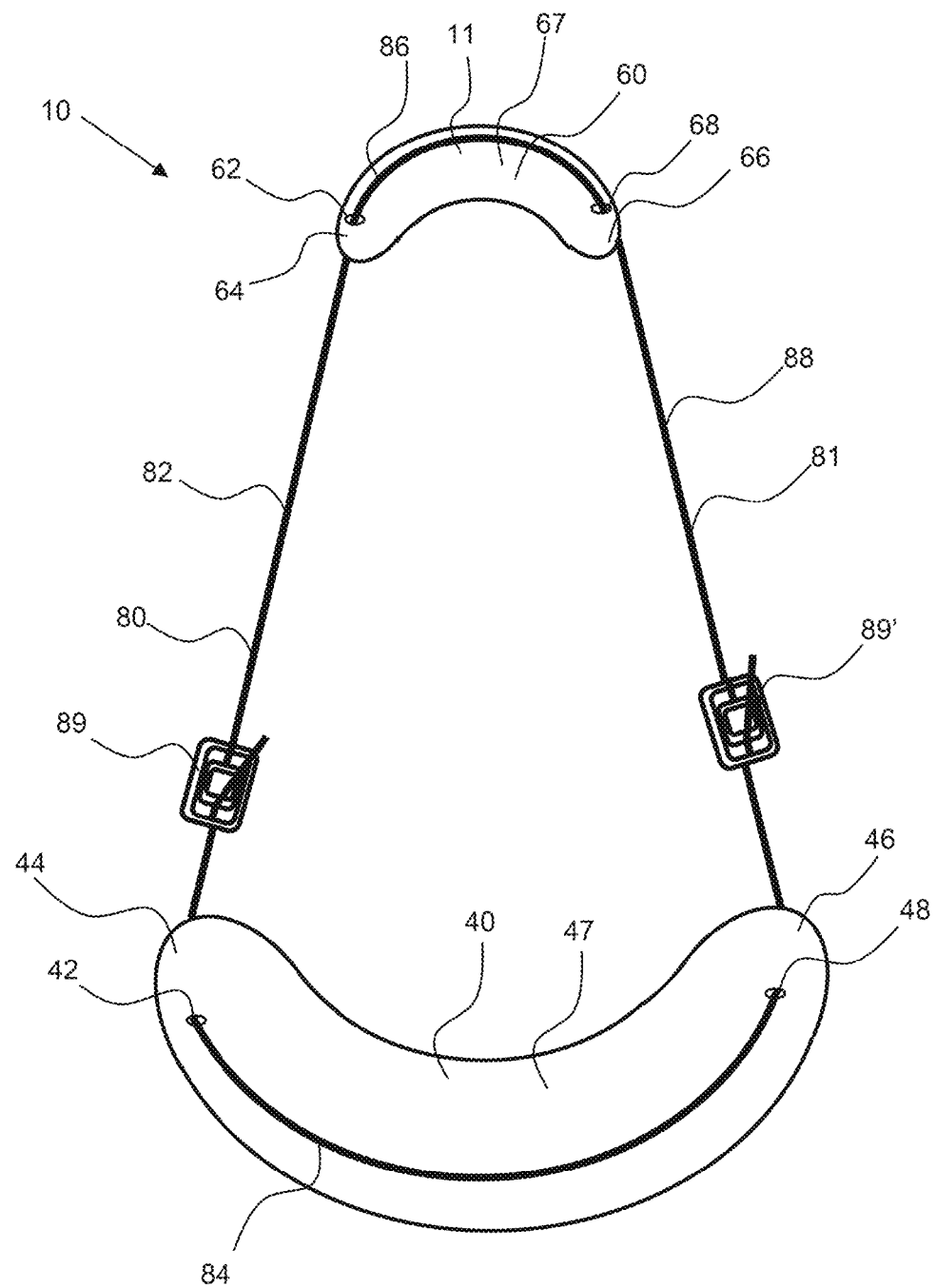
FIG. 2 shows a perspective view of a fly-casting training band that includes an arm strap and a hand strap coupled together by a first and second extension of an elastic band.
Figure 3:
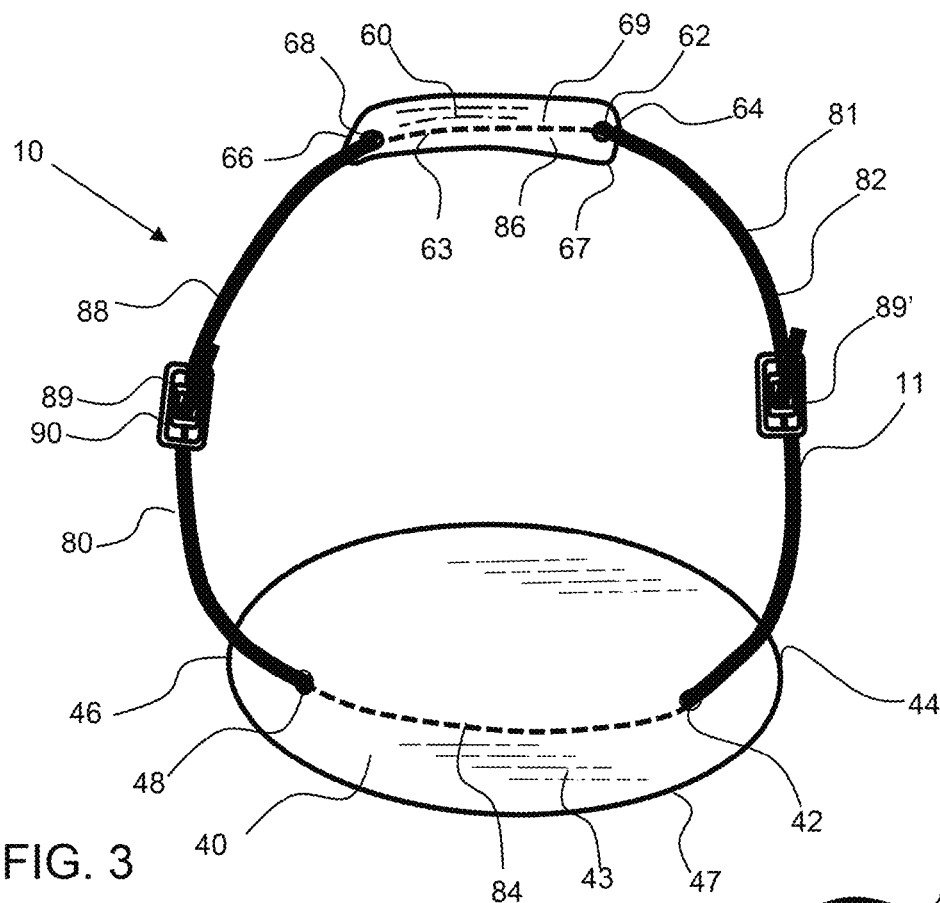
FIG. 3 shows a perspective view of a fly-casting training band that includes an arm strap and a hand strap coupled together by a first and second extension of an elastic band.
Figure 4:
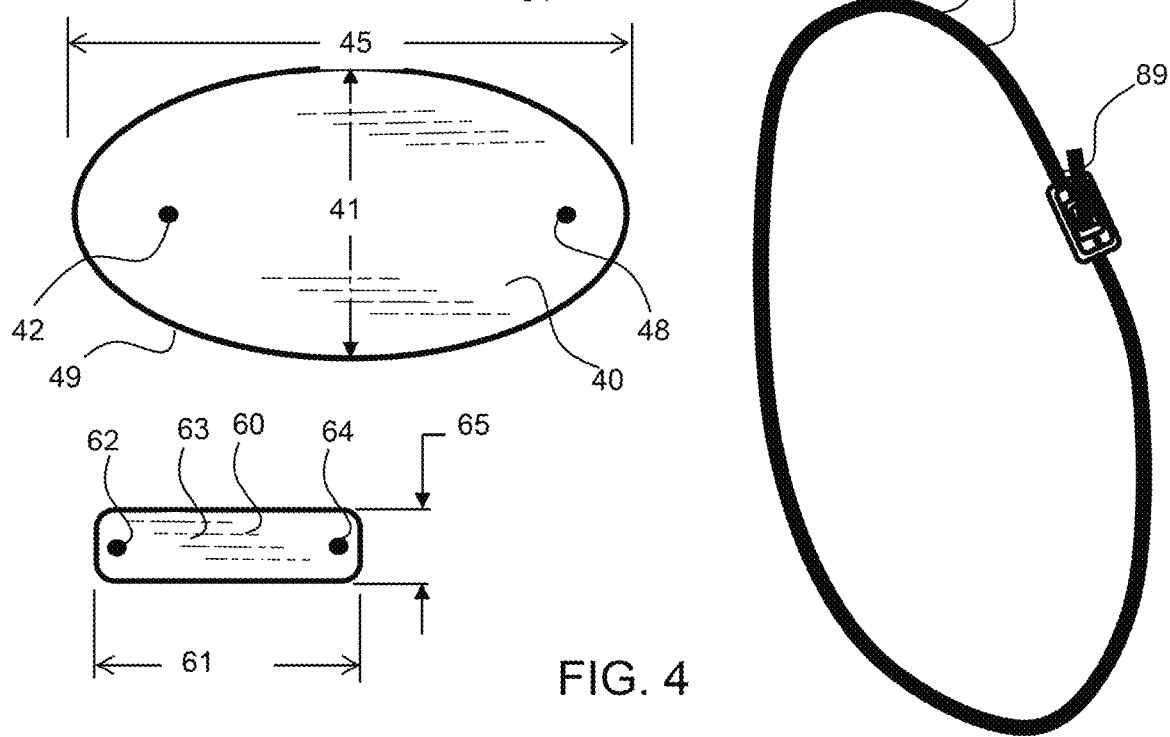
FIG. 4 shows the components of the Spey casting training band including the arm strap, the hand strap and the elastic tether having a length adjuster.

Referring now to FIGS. 2 to 4, a fly-casting training band system 10 utilizes a fly-casting training band 11 that includes an arm strap 40 and a hand strap 60 coupled together by a first tether extension 82 and second tether extension 88 of an elastic tether 80, which may be a continuous elastic band 81 that extends around each of the arm strap 40 and hand strap 60. As shown, the first tether extension 82 extends between a first hand strap end 64 and first arm strap end 44 and the second tether extension 88 extends between the second hand strap end 66 and second arm strap end 46. The elastic tether 80 may form an elastic band 81, a continuous loop that has a hand tether extension 86 that extends across the hand strap 60 on an exposed side 67 of the hand strap and has an arm tether extension 84 that extends across the arm strap 40, along the exposed side 47 of the arm strap 40. The elastic tether 80 may extend through a first hand strap aperture 62 configured proximal to the first hand strap end 64 (as defined herein) and then over the hand strap 60, on the exposed side 67 and then through a second hand strap aperture 68 proximal to the second hand strap end 66. Likewise, the elastic tether 80 may extend through a first arm strap aperture 42 configured proximal to the first arm strap end 44 and then over the arm strap 40 on the exposed side 47, and then through a second arm strap aperture 48 proximal to the second arm strap end 46. A length adjuster 89 is configured on the first tether extension 82 and a second length adjuster 89' may also be configured on the second tether extension 88.

As shown in FIG. 2, the exposed side 67 of the hand strap 60 and exposed side 47 arm strap 40 are shown with the elastic tether 80 extending along these exposed surfaces. The interior surface or surface configured for extending along the person's elbow or arm and around the thumb may be smooth for comfort.

As shown in FIG. 3, the arm side 43 of the arm strap is smooth as the arm tether extension 84 extends through the first arm strap aperture 42, along the exposed side 47 of the arm strap 40 to the second arm strap aperture 48 (depicted in dashed line). Likewise, the hand strap 60 is smooth as the hand tether extension 86 extending through the first hand strap aperture 62, along the exposed side 67 of the hand strap 60 to the second hand strap aperture 68 (depicted in dashed line). The elastic tether may have a length adjusters 89, 89', such as buckles 90 to adjust the length and may have terminated ends that are terminated on the exposed sides of the arm or hand strap with the terminated ends either tied together to set the length of the elastic tether or each tied in knots to prevent the terminated end from slipping through the aperture in the arm or hand strap or tied to the respective arm strap or hand strap. The hand strap 60 may have padding 69 on the hand side 63 for comfort and the padding may be foam or fabric that provides comfort along the inside of the thumb and hand in use. A padding may be an elastic material that can rebound to an original thickness after compression of 50% of the thickness or less.

As shown in FIG. 4, the arm strap 40 has a length 45 that may be about 10 cm or more, about 12.5 cm or more, about 15 cm or more, about 20 cm or more and any range between and including the values provided. The arms strap has a width 41 that may be about 4 cm or more, about 6 cm or more, about 8 cm or more, about 10 cm or more and any range between and including the values provided. The arm strap may be oval or round in shape having a curved perimeter and this continuously curved perimeter may provide comfort when fashioned around the back of a person's arm or elbow. The hand side 63 of the hand strap 60 is shown having a length 61 of about 2 cm or more, about 3 cm or more, about 4 cm or more, about 5 cm or more, about 6 cm or more, about 7 cm or more, about 8 cm or more and any range between and including the values provided. The hand strap has a width 65 that may be about 10 mm or more, about 15 mm or more, about 20 mm or more, about 15 mm or more, about 30 mm or more and any range between and including the width values provided. The elastic tether has a length of about 60 cm or more, about 70 cm or more, about 80 cm or more, about 90 cm or more and any range between and including the length values provided. The elastic tether may be round in cross-section or may be flat, or tape shaped.

The elastic tether may be elastic and rebound back to an original length after removal of an elongating force. An elastic tether and/or the tether extensions may have an elongation force, force to elongate the elastic tether an elongation length, of about 1.5 kg/5 cm or more, about 2.5 kg/5 cm or more, about 3.0 kg/5 cm or more and any range between and including the elongation force values provided.

Figure 5:
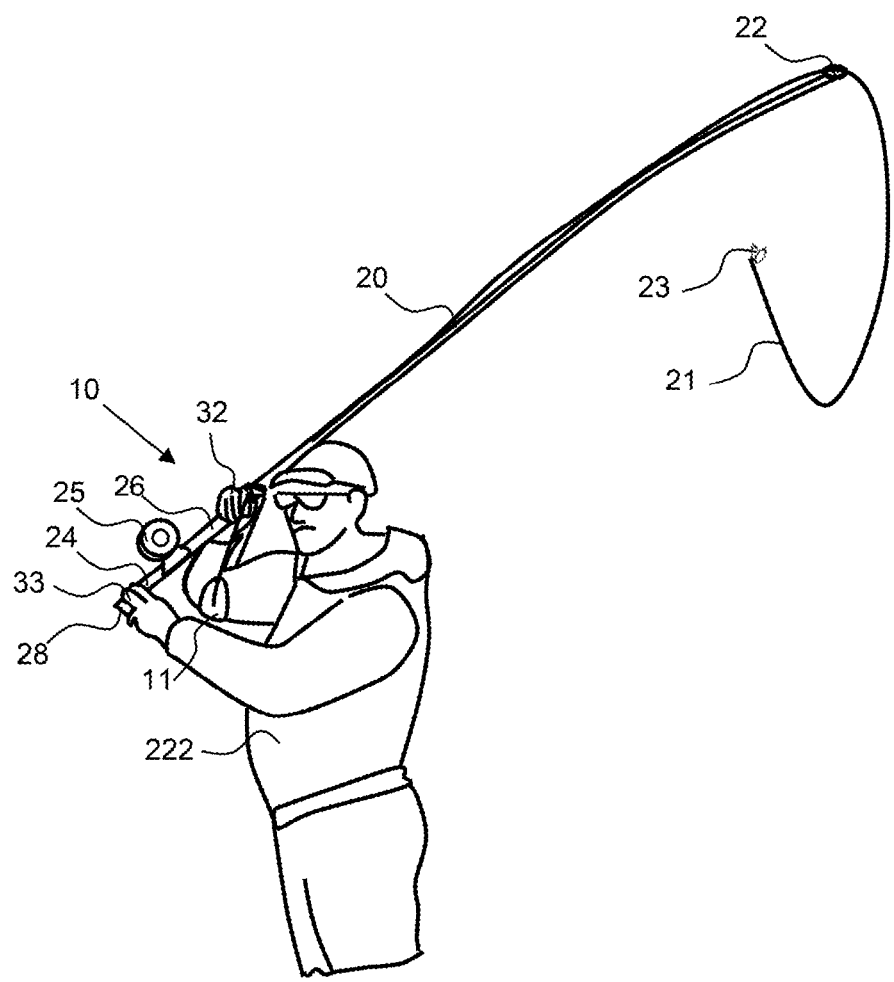
FIG. 5 shows a fisherman using the fly-casting training band system to cast a Spey fishing rod.

As shown in FIG. 5, a fisherman 222 is using the fly-casting training band system 10 to cast a fly-fishing rod 20 with the fly-casting training band 11 configured around their top arm and top hand (right hand as shown) to provide resistance when they extend their top hand to push the fly-fishing rod 20 away from them the during a cast. Again, the top hand and top arm may be a dominant hand and dominant arm, and this device encourages them to use their non-dominant hand and arm to pull the end handle of the rod toward them versus pushing the rod handle with their top hand. The fly-casting training band 11 trains the fisherman to pull the end handle 24 with their bottom hand, which may be left hand, as shown. The fly-fishing rod has a reel 25 and fishing line 21 with a fly 23 coupled to the end of the fishing line. The fly-fishing rod extends a length from the rod end 28 to the tip end 22.

Figure 6:
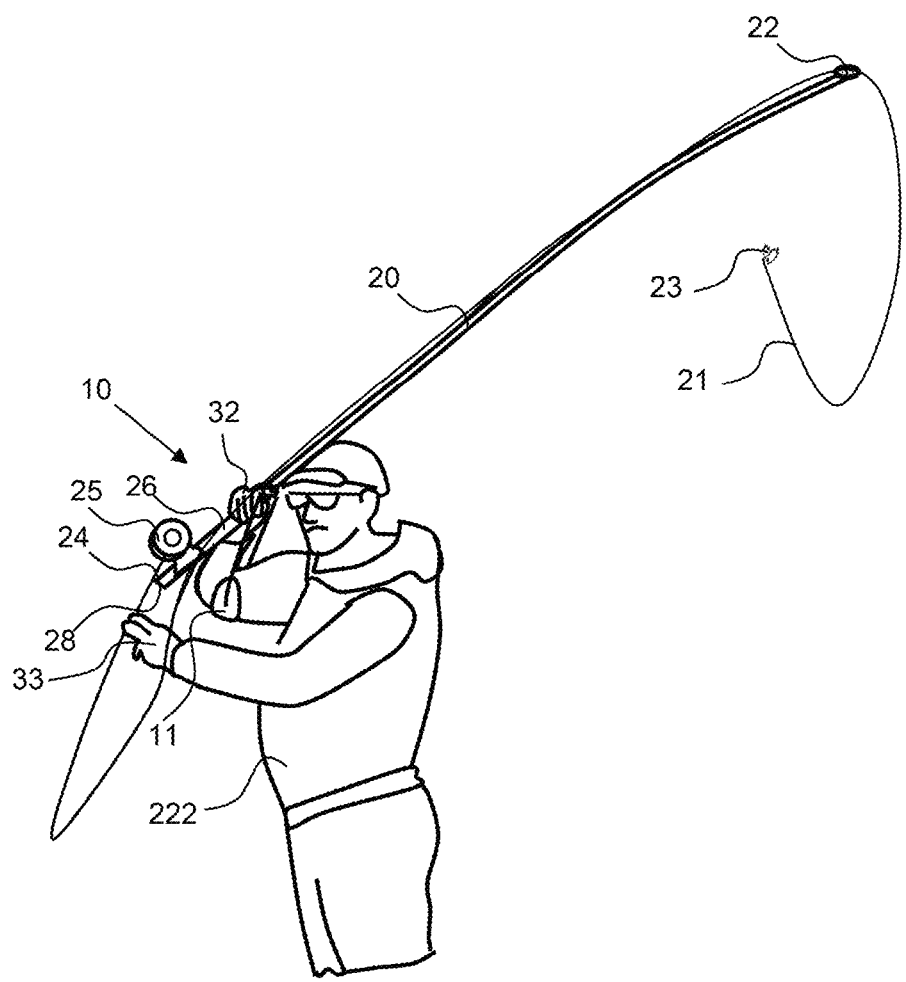
FIG. 6 shows a fisherman using the fly-casting training band system to cast a Spey fishing rod and is pulling the fishing line in a "haul" of the fishing line.

As shown in FIG. 6, a fisherman has pulled slack in the fishing line 21, a haul, to aid in casting to provide reduced resistant of the line as the fishing rod is pivoted by pulling on the end handle 24 of the fly-fishing rod 20 with their bottom hand 33. Their dominate hand is configured above the reel 25 and is just used to guide or direct the rod in the direction of casting.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention covers the modifications, combinations and variations of this invention provided they come within the scope of the appended claims and their equivalents.

What is claimed is:

1. A method of fly-casting comprising:
   a) providing a fly-casting training band system comprising:
      i) a fly-casting training band comprising:
         an arm strap extending from a first arm strap end to a second arm strap end;
         a hand strap extending from a first hand strap end to a second hand strap end;
         a first tether extension extending between the arm strap and hand strap and coupling together said first hand strap end and said first arm strap end;
         a second tether extension extending between the arm strap and hand strap and coupling together said second hand strap end and said second arm strap end;
      wherein the first tether extension and the second tether extension are elastic;
   b) configuring the fly casting band around a top arm and a top hand of a person with the arm strap extending around an elbow of said top arm and the hand strap extending around a thumb on said top hand;
   c) providing a fly-fishing rod with a reel configured between an end handle and a rod handle;
   d) providing fishing line coupled with the reel;
      wherein the end handle is proximal to a rod end of said fly-fishing rod and
      wherein said rod handle is configured between the reel and a tip end of the fly-fishing rod;
   e) grasping the rod handle with the top hand;
   f) grasping the end handle with a bottom hand of said person; and
   g) pulling the rod end with the bottom hand toward said person to pivot the tip end away from said person to cast said fishing line from the fly-fishing rod.

2. The method of claim 1, wherein the first tether extension and the second tether extension are coupled with an arm tether extension and hand tether extension to form an elastic band that is continuous.

3. The method of claim 1, wherein the elongation force of the first tether extension and second tether extension is at least 2.5 kg/5 cm of extension.

4. The method of claim 1, wherein the fly-casting training band further comprises a length adjuster coupled with one of the first tether extension or second tether extension and configured to adjust a length of the respective first tether extension or second tether extension.

5. The method of claim 4, wherein the fly-casting training band comprises a length adjuster coupled with each of the first tether extension and second tether extension and configured to adjust a length of the respective first tether extension and second tether extension.

6. The method of claim 1, wherein a length of the first tether extension and second tether extension is at least 25 cm.

7. The method of claim 1, wherein the arm strap has an area that is at least twice an area of the hand strap.

8. The method of claim 1, wherein the arm strap is a supple material.

9. The method of claim 8, wherein the arm strap has a thickness of no more than 10 mm.

10. The method of claim 9, wherein the arm strap has a length from the first arm strap end to the second arm strap end that is 10 cm or more.

11. The method of claim 10, wherein the arm strap has a curved perimeter.

12. The method of claim 11, wherein the arm strap tapers from a center of the arm strap towards each of the first arm strap end and the second arm strap end.

13. The method of claim 1, wherein the hand strap is a supple material.

14. The method of claim 13, wherein the hand strap has a thickness of no more than 10 mm.

15. The method of claim 14, wherein the hand strap has a width that is no more than 30 mm.

16. The method of claim 1, wherein the first tether extension and second tether extension extend on opposing sides of a forearm of said person when the fly casting band is configured around said top arm and said top hand of said person.

* * * * *